(12) United States Patent
Reijndorp et al.

(10) Patent No.: US 8,487,750 B2
(45) Date of Patent: Jul. 16, 2013

(54) METHOD AND APPARATUS FOR MONITORING USER ACTIVITY AT A COMPUTER SCREEN TO STIMULATE MOTILITY

(75) Inventors: Jochem Reijndorp, Rotterdam (NL); Martijn Spit, Delft (NL); Nathalie Dorothee Pieternel Leurs, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 789 days.

(21) Appl. No.: 12/376,126

(22) PCT Filed: Aug. 7, 2007

(86) PCT No.: PCT/IB2007/053122
§ 371 (c)(1),
(2), (4) Date: Oct. 7, 2009

(87) PCT Pub. No.: WO2008/018027
PCT Pub. Date: Feb. 14, 2008

(65) Prior Publication Data
US 2010/0045469 A1    Feb. 25, 2010

Related U.S. Application Data

(60) Provisional application No. 60/821,619, filed on Aug. 7, 2006.

(51) Int. Cl.
*H04B 3/36* (2006.01)
*G08B 21/00* (2006.01)
*G09G 5/00* (2006.01)

(52) U.S. Cl.
USPC .......... 340/407.2; 340/407.1; 340/573.1; 345/156; 345/164

(58) Field of Classification Search
USPC .......... 340/573.1, 573.5, 573.7, 407.1, 407.2; 345/156, 157, 158, 164, 440, 772; 714/47.2; 702/176, 186
See application file for complete search history.

(56) References Cited

U.S. PATENT DOCUMENTS

| | | | |
|---|---|---|---|
| 4,868,549 A * | 9/1989 | Affinito et al. | 345/164 |
| 6,065,138 A | 5/2000 | Gould et al. | |
| 6,243,076 B1 * | 6/2001 | Hatfield | 345/156 |
| 6,281,881 B1 * | 8/2001 | Siddiqui et al. | 345/164 |
| 6,810,259 B1 * | 10/2004 | Zhang | 455/456.5 |

(Continued)

FOREIGN PATENT DOCUMENTS

| | | |
|---|---|---|
| JP | 63157302 A | 6/1988 |
| JP | 4198986 A | 7/1992 |

(Continued)

OTHER PUBLICATIONS

Rong, Guan Ao et al; "Human Body Motion Image Analysis System", IEEE 11TH Int. Conf. Engg. Med. & Biology Society, 1953.

(Continued)

*Primary Examiner* — Van T. Trieu (57) ABSTRACT

A system and method for stimulating user motility is provided. According to the invention a monitoring system receives information associated with a user of a computer, and a display associated with the computer having the display coupled to the monitoring system. The computer generates a feedback to the user based upon the received information.

23 Claims, 4 Drawing Sheets

U.S. PATENT DOCUMENTS

| | | | |
|---|---|---|---|
| 6,927,770 B2 * | 8/2005 | Ording | 345/440 |
| 7,046,232 B2 * | 5/2006 | Inagaki et al. | 345/158 |
| 7,439,951 B2 * | 10/2008 | Rosenberg et al. | 345/156 |
| 2004/0175020 A1 | 9/2004 | Bradski et al. | |

FOREIGN PATENT DOCUMENTS

| | | |
|---|---|---|
| JP | 2004348429 A | 9/2004 |
| JP | 2005107981 A | 4/2005 |
| JP | 2005267491 A | 9/2005 |
| NL | 1025798 C1 | 3/2004 |
| TW | 455483 A | 9/2001 |

OTHER PUBLICATIONS

Yuan-Pin Lin et al; "Webcam Mouse Using Face and Eye Tracking in Various Illumination Environments", Proc. of the 2005 IEEE, Engineering in Medicine and Biology 27TH Annual Conf., Shanghai, China, September 1-4, 2005, pp. 3738-3741.

* cited by examiner

METHOD AND APPARATUS FOR MONITORING USER ACTIVITY AT A COMPUTER SCREEN TO STIMULATE MOTILITY

FIELD OF THE INVENTION

The present invention relates generally to devices and methods for monitoring user activity at a computer, and more specifically for monitoring user activity to stimulate motility.

BACKGROUND OF THE INVENTION

Humans who work behind a computer screen have an undesirable tendency of maintaining a static body posture for a prolonged period of time. This typically results in stiffness in the neck and shoulders. It is noted that even maintaining a correct body posture has negative effects for people working with computers when the same body posture is maintained for a prolonged period of time. Frequent small changes in the body posture are recommended when performing computer screen work for prolonged periods of time, thereby preventing Repetitive Strain Injuries (RSI). The small changes in body posture are referred to as motility.

In addition, from ergonomic research, it is known that having the proper viewing angle is essential in minimizing vision and musculoskeletal disorders. From observations, it is known that many people have their monitor at too high of a position. This is partly because people sit upright during monitor placement and sink back in their chairs during actual use, and partly because users think they have the right monitor placement, but they lack knowledge on this subject or measure inaccurately. This problem is generally solved by coaching users in and reinforcing proper positioning during regular use. However, such coaching is generally incomplete because users tend to have an inaccurate understanding of their viewing distance or viewing angle relative to the computer display.

Various devices for inducing motility are known. One example is a product called the Kinetic-XS (see http://www.kinetic-xs.nl), which discloses a motorized adapter that is disposed between a computer display and a supporting arm to the display. The adapter creates a very slow rotation (2 degrees at 0.4 Hz) of the display unit in the sagittal plane of the user around an axis located in the center of mass of the computer display. Because of the rotation of the display, a person sitting in front of the display has increased movements of the head, and thus an increase in cervical motion. However, the disadvantage to such a solution is the rotation of an entire computer display, which requires a motorized adapter.

There are other ways of monitoring the motility of a computer screen worker such as by using pressure sensors in the seat of the office chair, but these solutions are not simple and low cost.

However, a significant drawback of the existing means or programs that coach a user to change behavior is that such means or programs typically interrupt a user or require a user to switch to a different mode other than an existing mode of operation. For example, users get a pop-up screen and are typically unable to continue their respective work until they have "clicked away" the screen. For applications that coach the user to work more ergonomically, to prevent RSI, or to stimulate motility, a different kind of feedback is desired.

SUMMARY OF THE INVENTION

Such a solution includes a device and method for stimulating motility in a user of a computer. According to the invention a monitoring system 10, 12, 14 receives information associated with a user 15 of a computer 14, and a display 16 associated with the computer 14 having the display 16 coupled to the monitoring system 10, 12, 14. The computer generates a feedback 30, 32, 34, 36 to the user 15 based upon the received information.

The monitoring system preferably comprises a camera 12 associated with or integrated into a computer display 16, such as a webcam for example. The computer activity of the user monitored by the monitoring system is preferably a user's non-ergonomic position or lack of movement relative to the computer display over a certain period of time. One example of feedback generated to a user is a change in a visual characteristic of an element on the display screen, such as a change in the color or shape a mouse pointer 28 or other input device. Another example of feedback is a software-generated rotation or translation of a displayed image 36.

In an example embodiment the feedback to the user is generated if the monitored activity is below a predefined level in order to persuade a user to change behavior and lower the risk of the user developing an RSI.

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present invention.

Before describing in detail embodiments that are in accordance with the present invention, it should be observed that the embodiments reside primarily in combinations of method acts and apparatus components related to persuade a user associated with a visual display monitor to change behavior based on usage. Accordingly, the apparatus components and method acts have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of persuading a user associated with visual display monitor to change behavior based on usage described herein. The non-processor circuits may include, but are not limited to, a radio receiver, a radio transmitter, signal drivers, clock circuits, power source circuits, and user input devices. As such, these functions may be interpreted as acts of a method to perform persuading a user associated with visual display monitor to change behavior based on usage. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
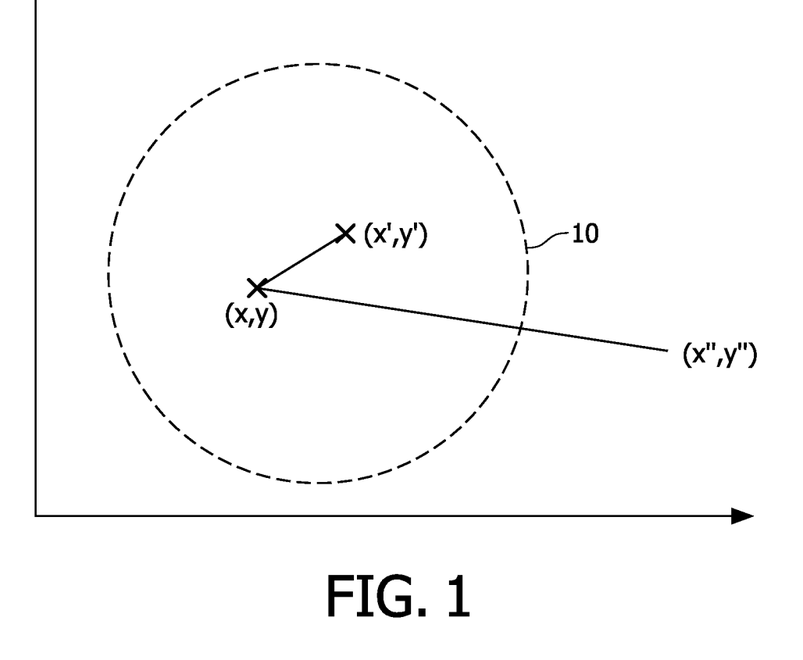
FIG. 1 is an example of a co-ordinate system in accordance with an embodiment of the invention.
Figure 2:
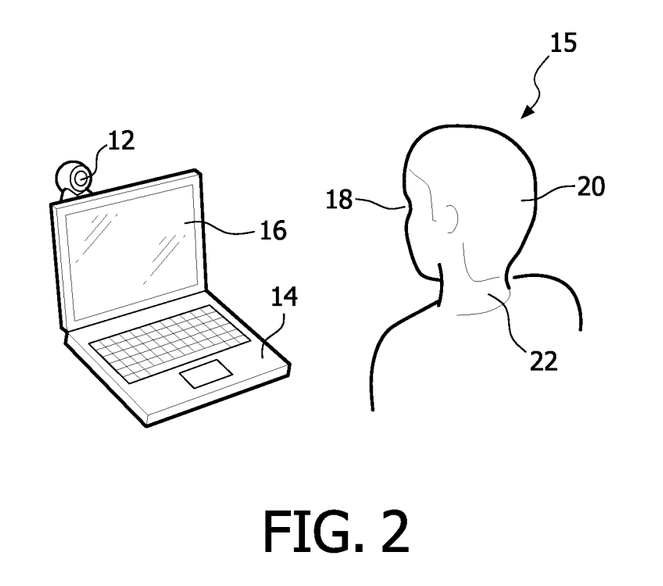
FIG. 2 is an example in accordance with an embodiment of the invention.
Figure 3:
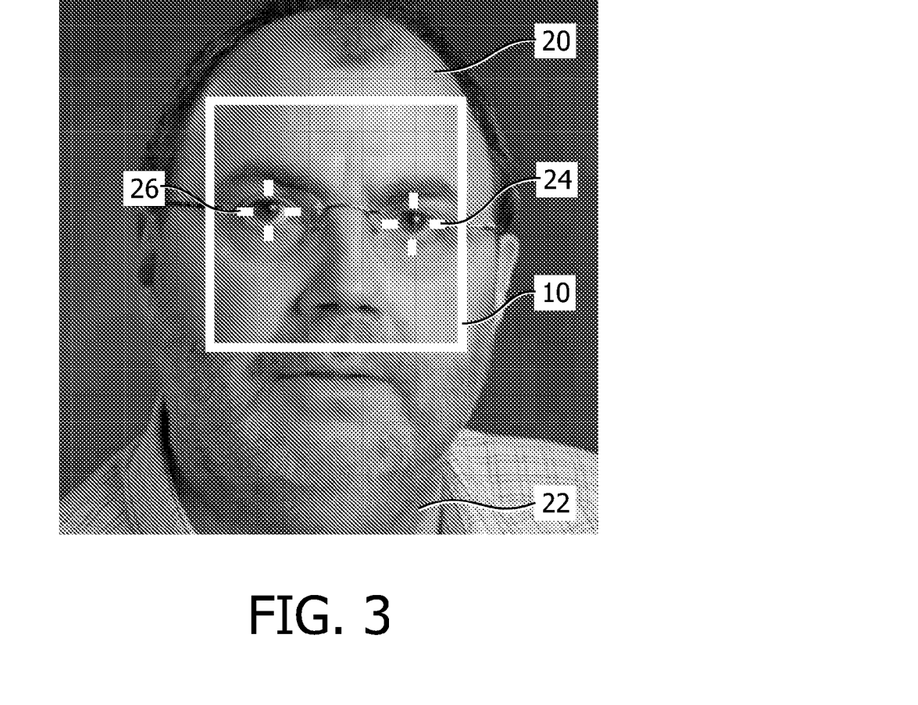
FIG. 3 is an example of face recognition and eye movement detection in accordance with an embodiment of the invention.

One embodiment of the present invention is illustrated in FIGS. 1-3. FIG. 1 graphically illustrates a two-dimensional image depicting a neighborhood 10, which is taken by a monitoring system such as a video camera or webcam 12 (FIG. 2). Webcam 12 is coupled to a computing device such as a computer 14, which has a display 16 associated therewith. While a laptop computer 14 is illustrated, it will be appreciated that other computing platforms, such as a desktop computer, can be used. Webcam 12 is positioned adjacent to the display 16 or integrated into the body of the display (not shown) as is more prevalent with newer computer models. Webcam 12 monitors and records user activity such as, but not limited to, actions or inactions of a screen worker 15 in front of the display 16 of the computer 14. Software algorithms that run on the computer 14 monitor and/or track the position or body posture of the screen worker 15 over time. When it is found that there is not enough change in the detected body posture for a certain period of prolonged screen work, the screen worker 15 receives feedback and advice regarding same. In other words, if the monitored activity is below a predefined level, in order to persuade a user to change behavior and lower the risk of the user developing an RSI, the screen worker 15 receives feedback and/or advice regarding same.

Changes in the detected body positioning can be achieved by an image taken by a monitoring system, such as a webcam 12 or other video recording device (not shown), whereby a fixed point (x, y), after the elapse of a predetermined period of time is within (x', y') or outside (x", y") the predetermined neighborhood 10. If without (x", y") the predetermined neighborhood 10, no feedback or action is required. If within (x', y') the predetermined neighborhood 10, certain actions or feedbacks are performed, which is described infra. Point (x, y) may, for example, be a point on or about an eye 18 (FIG. 2) of screen worker 15. The feedback comprises displaying a message on the screen 16; or manifested in the various embodiments described herein.

By way of example in FIG. 3, the computerized tracking of the body posture can be performed by detecting and tracking the pupils 24, 26 within a designated neighborhood 10 on a user's face 20 and the body contour of the screen worker 15. When it is found that there are not enough changes in the detected body posture for a certain period of prolonged screen work, the screen worker 15 gets a feedback and/or advice regarding same. For example, if the body posture change is less than a threshold amount the screen will provide feedback by providing an indication on the screen, which the screen worker 15 will understand as an indication to change behavior.

FIG. 3 illustrates a practical example of the system of FIGS. 1 and 2. A first point 24 on or about the left eye of screen worker 15 is the equivalent of point (x, y). Alternatively, a second point 26 on or about the right eye of screen worker 15 is the equivalent of point (x', y'). For both first point 24 and second point 26, a predetermined neighborhood 10 is designated on the face 20 of screen worker 15. With a monitoring device, such as a webcam 12, which is either integrated in, or coupled to the display 16, and specific software algorithms in the computer 14, the body posture, positioning and/or movement of points 24 and 26 of screen worker 15 is monitored over time. Based upon such monitoring, a feedback preferably including advice on frequent changes of body posture is given accordingly. Therefore, the risk of developing RSI can be lowered.

Feedback is provided to a user when it is desired to address motility issues and reduce the risk of developing an RSI. In one example, a user's movement over time is monitored via a webcam 12 or the like. Such movement could be the tracking of the user's pupils as shown in FIG. 3, or the movement or positioning of other body parts of screen worker 15 as the case may be. Other monitored activity could include keyboard activity, mouse activity, and the like. When it is found that there is not enough change in the monitored activity, such as a detected body posture based upon tracking the pupils and the body contour for a certain period of prolonged screen work, the screen worker 15 gets a feedback and/or advice incorporated in various embodiments of the present invention. Various threshold levels can be incorporated which would trigger the feedback and/or advice.

Figure 4:
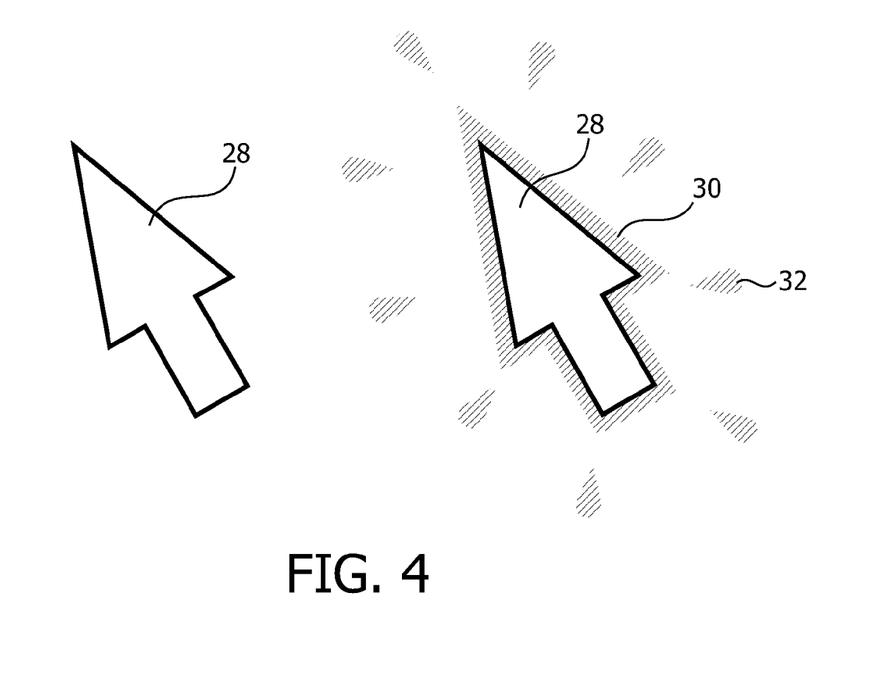
FIG. 4 is an example of changing the color, shape, and the like of a mouse pointer in accordance with an embodiment of the invention.
Figure 5:
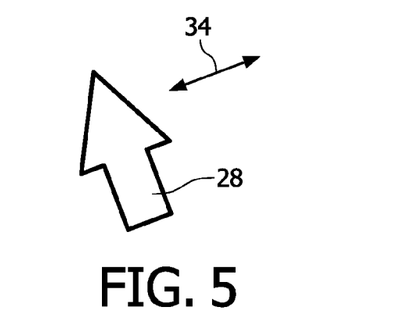
FIG. 5 is an example in accordance with an embodiment of the invention.

In FIG. 4, according to one embodiment of the present invention, one way to persuade the user to reduce the risk of developing an RSI, such as to take breaks, do exercises, and change behavior, is to change the visual characteristic of an element on the display, such as a mouse pointer 28 on the display 16 (FIG. 2). Based on monitored computer usage and information derived from the webcam 12, for example, the visual characteristic of an element on a display 16 is changed. Computer usage includes keyboard activity, mouse activity, and the like. Information derived from the webcam 12 includes viewing distance, viewing angle, viewing time, and the like. Visual characteristics of an element on display 16 include shapes, color, and other characteristics of the mouse pointer 28 or cursor, and the like. For example, mouse pointer 28 may change color or thickness resulting in a colored (not shown), and thickened mouse pointer 30. Alternatively, mouse pointer 28 may change into something that encompasses a peripheral or neighborhood around mouse pointer 28, such as blinking dots or radiations 32 around mouse pointer 28 within the peripheral or neighborhood. Alternatively as shown in FIG. 5, mouse pointer 28 may pulsate or move up and down about a predetermined neighborhood 34 at a predefined rate. Such change in visual characteristic is a signal to the user to increase motility.

Several variations in regard to a mouse pointer 28 are described herein. Preferably a selection of the best one that helps user 15 is the one that creates the urge to take a break, do exercises, etc. The user 15 could have the option of varying the visual characteristic with the type of computer activity monitored by the webcam or monitoring system. For example, the mouse pointer 28 could change color if the user's ergonomic positioning is improper, and/or the mouse pointer 28 could start blinking if the user hasn't moved for a while. Therefore, a variety of feedback scenarios are possible with one or more displayed elements changing a visual characteristic as desired and modifiable by the user.

As can be appreciated, modifying a visual characteristic of a mouse pointer, for example, which is generally always present on the display and difficult to ignore, provides a user with immediate feedback, as compared with the generating of feedback by launching a separate application on the computer or by referencing an outside source such as a coaching guide, etc. This feedback model allows a user to receive feedback and continue working on the same application without going to a separate or outside application to clear a feedback message or the like.

Figure 6A:
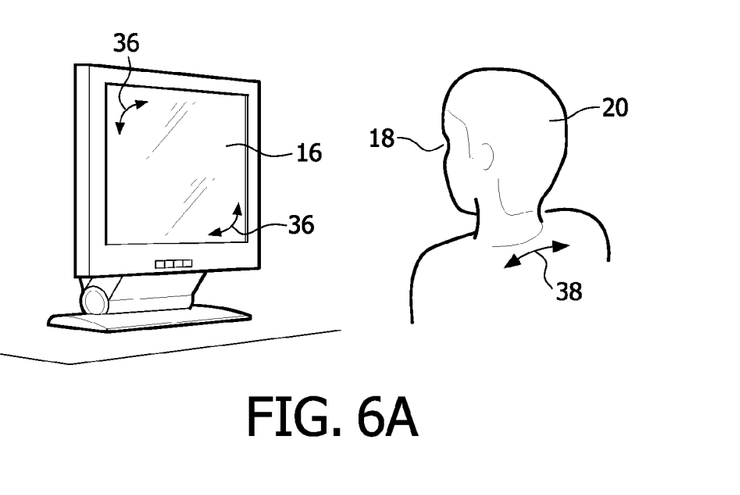
FIG. 6A is an example of a screen rotation in accordance with an embodiment of the invention.

In FIG. 6A, in accordance with another embodiment, to stimulate small movement in neck 22 and shoulders of screen worker 15, the displayed image on the computer screen 16 is rotated 36 or translated (not shown). For example, the displayed image on a computer monitor 16 may be slowly rotated on a very small angle (for example, 2 degrees at 0.4 Hz) in order to increase motility and prevent prolonged static postures of screen worker 15 (FIG. 2). The rotated displayed screen image 36 stimulates the muscles in neck 22 and shoulders of the screen worker 15 to prevent RSI-type injuries. As can be seen, only the displayed image itself is rotated, not the entire computer screen 16 as discussed in connection with the Kinetic-XS product above. In accordance with one embodiment of the present invention, the rotation or translation actions are completely software driven actions, which require no additional hardware like with the Kinetic-XS product. Software installed on the user's computer 14 renders a tumbled image of the original image on the computer screen 16. As a result, a software-driven, small, continuously tumbling motion of the displayed image is generated.

Figure 6B:
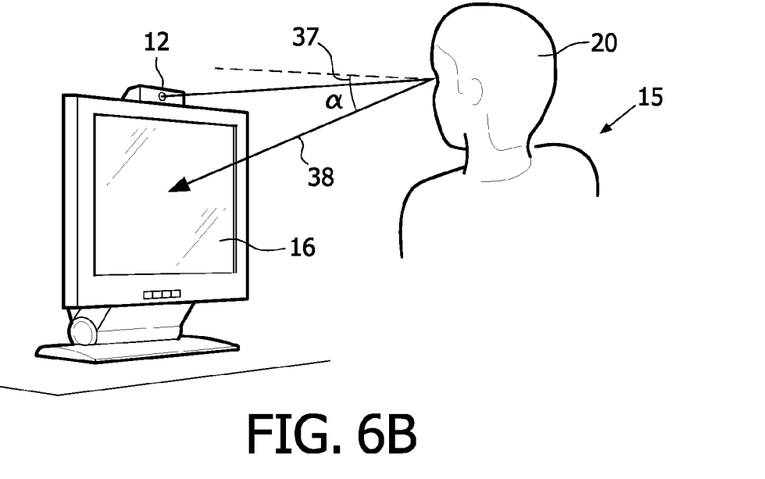
FIG. 6B is an example of an application of an embodiment of the invention.

Further, as shown in FIG. 6B, the present invention may be used by the screen worker 15 to adjust her viewing angle 37, which can be determined by measuring viewing distance 38 combined with the rotation of a monitor 16. The viewing distance 38 can be detected by tracking a face 20 with webcam 12, which may be integrated in monitors or displays 16. Thus the monitored activity can be the ergonomic positioning of the screen worker 15. If the ergonomic positioning is at or below a predefined threshold level, a feedback (28, 36) is generated to the screen worker 15.

Figure 7:
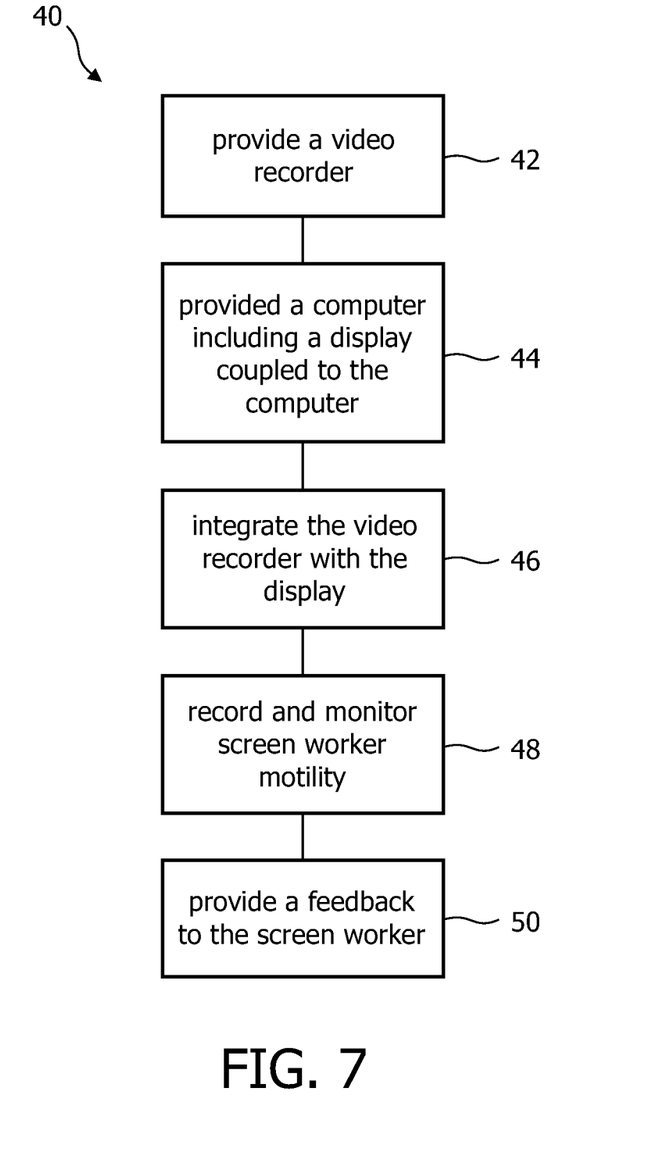
FIG. 7 is an example of a flowchart in accordance with an embodiment of the invention.

Referring to FIG. 7, one embodiment of a flowchart 40 for providing a feedback upon a user positioned before a computer display is depicted. A monitoring system, such as a video recorder, which is adapted to record body movement including a suitable camera or webcam, is provided (Block 42). A computer including a display coupled to the computer that is adapted to run suitable computer programs or algorithms is provided (Block 44). The video recorder of Block 42 is integrated with the display of Block 44 (Block 46). The integration may include suitably coupling the video recorder with the display, or forming the video recorder physically within the display or other parts of the computer. A screen worker's motility information is recorded and monitored using the combination of the video recorder and the computer (Block 48). Based upon the recorded and monitored information, a feedback is provided to the screen worker (Block 50). The feedback comprises various embodiments shown in FIGS. 1-6B.

An apparatus and method are provided to persuade a user 15 associated with visual display monitor 16 to change behavior based on usage. The behavior changes include taking breaks, doing exercise etc. Based upon usage such as viewing time, the visual characteristics of the mouse pointer 28 are changed, so that the user is persuaded to change behavior. Usage may be detected from or by keyboard, mouse and information derived from the webcam 12, In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In an embodiment of the present invention, some or all of the method components are implemented as a computer executable code, which is capable of being distributed in a form of a computer readable medium of instructions and in a variety of forms. Such a computer executable code contains a plurality of computer instructions that when performed in a predefined order result with the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more central processing units ("CPU"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

Further, the present invention applies equally regardless of the particular type of signal bearing media actually used to carry out the distribution. Examples of computer readable media include recordable-type media such a floppy disc, a hard disk drive, a RAM (including DRAM, SDRAM and the like), a CD-ROM, a DVD-ROM, flash MEM, and transmission-type media such as digital and analog communications links, wired or wireless communications links using transmission forms such as, for example, radio frequency and light wave transmissions.

The functions of the various elements shown in the figures may be provided through the use of dedicated hardware as well as hardware capable of executing appropriate software. When provided by a processor, the functions may be provided by a single dedicated processor, by a single shared processor, or by a plurality of individual processors, some of which may be shared. Explicit use of the term "processor" or "controller" should not be construed to refer exclusively to hardware capable of executing software, and may implicitly include, without limitation, digital signal processor hardware, ROM, RAM, and non-volatile storage.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for stimulating motility in a user of a computer, comprising:
a display associated with the computer;
a monitoring system associated with the computer, wherein the monitoring system is configured to monitor a level of motility of the user within or outside of a predetermined neighborhood during a certain time period of computer activity by the user; and
a feedback generated on the display in response to the monitored motility level of the user during the certain time period of computer activity by the user within or outside of the predetermined neighborhood being determined below a predefined motility level, wherein the feedback comprises an immediate indication to the user to increase motility while allowing the user to continue working with a same application on the computer without going to a separate application.

2. The system of claim 1, wherein the feedback further comprises a change in a visual characteristic of an element displayed on the display.

3. The system of claim 2, wherein the displayed element is associated with an input device connected to the computer.

4. The system of claim 3, wherein the displayed element comprises a mouse pointer.

5. The system of claim 4, wherein the feedback further comprises a change in color or shape of the mouse pointer.

6. The system of claim 4, wherein the feedback further comprises movement of the mouse pointer.

7. The system of claim 1, wherein the feedback further comprises a software-generated rotation of a screen image on the display.

8. The system of claim 7, wherein the feedback further comprises a software-driven, small continuous tumbling motion of the screen image on the display.

9. The system of claim 1, wherein the monitoring system further comprises a camera associated with the display.

10. The system of claim 1, wherein the monitored computer activity further comprises an ergonomic positioning of the user relative to the display, and wherein the feedback is software-generated on the display in response the monitored computer activity of the user being determined to be improperly ergonomically positioned relative to the display.

11. The system of claim 10, wherein the ergonomic positioning further comprises the user's viewing distance to the display.

12. The system of claim 10, wherein the ergonomic positioning further comprises the user's viewing angle to the display.

13. The system of claim 1, wherein the monitored computer activity further comprises movement of the user relative to the display during a predetermined period of time, and wherein the feedback is further generated on the display in response to the monitored computer activity being determined below the predefined level during the predetermined period of time.

14. The system of claim 13, wherein the monitored computer activity further comprises movement of the user's pupils relative to the display.

15. A method of stimulating motility in a user of a computer having a display, the method comprising:
monitoring a level of motility of the user within or outside of a predetermined neighborhood during a certain time period of computer activity by the user with a monitoring system associated with the computer; and
generating a feedback on the display based on the monitored motility level of the user during the certain time period of computer activity by the user within or outside of the predetermined neighborhood being determined below a predefined motility level, wherein the feedback comprises an immediate indication to the user to increase motility while allowing the user to continue working with a same application on the computer without going to a separate application.

16. The method of claim 15, further comprising monitoring an ergonomic positioning of the user relative to the display and generating the feedback on the display for the user to correct an improper ergonomic position.

17. The method of claim 16, wherein the ergonomic positioning further comprises the user's viewing distance to the display or the user's viewing angle to the display.

18. The method of claim 15, further comprising monitoring movement of the user relative to the display for a predetermined period of time, and generating the feedback on the display in response to the monitored computer activity being determined below a predefined motility level during the predetermined period of time.

19. The method of claim 18, further comprising monitoring movement of the user's pupils relative to the display.

20. The method of claim 15, wherein the feedback further comprises software-generated feedback that includes a change in a visual characteristic of an element displayed on the display.

21. The method of claim 20, wherein the feedback further comprises a change in color, shape or position of a mouse pointer displayed on the display.

22. The method of claim 20, wherein the feedback further comprises at least one of a rotation of a screen image on the display and a small continuous tumbling motion of the screen image on the display.

23. A non-transitory computer readable medium embodying computer executable instructions, when executed in a computer-implemented system, for stimulating motility in a user of a computer having a display, the method comprising:

monitoring a level of motility of the user within or outside of a predetermined neighborhood during a certain time period of computer activity by the user with a monitoring system associated with the computer-implemented system; and generating a feedback on the display based on the monitored motility level of the user during the certain time period of computer activity by the user within or outside of the predetermined neighborhood being determined below a predefined motility level, wherein the feedback comprises an immediate indication to the user to increase motility while allowing the user to continue working with a same application on the computer without going to a separate application.

* * * * *